UNITED STATES PATENT OFFICE.

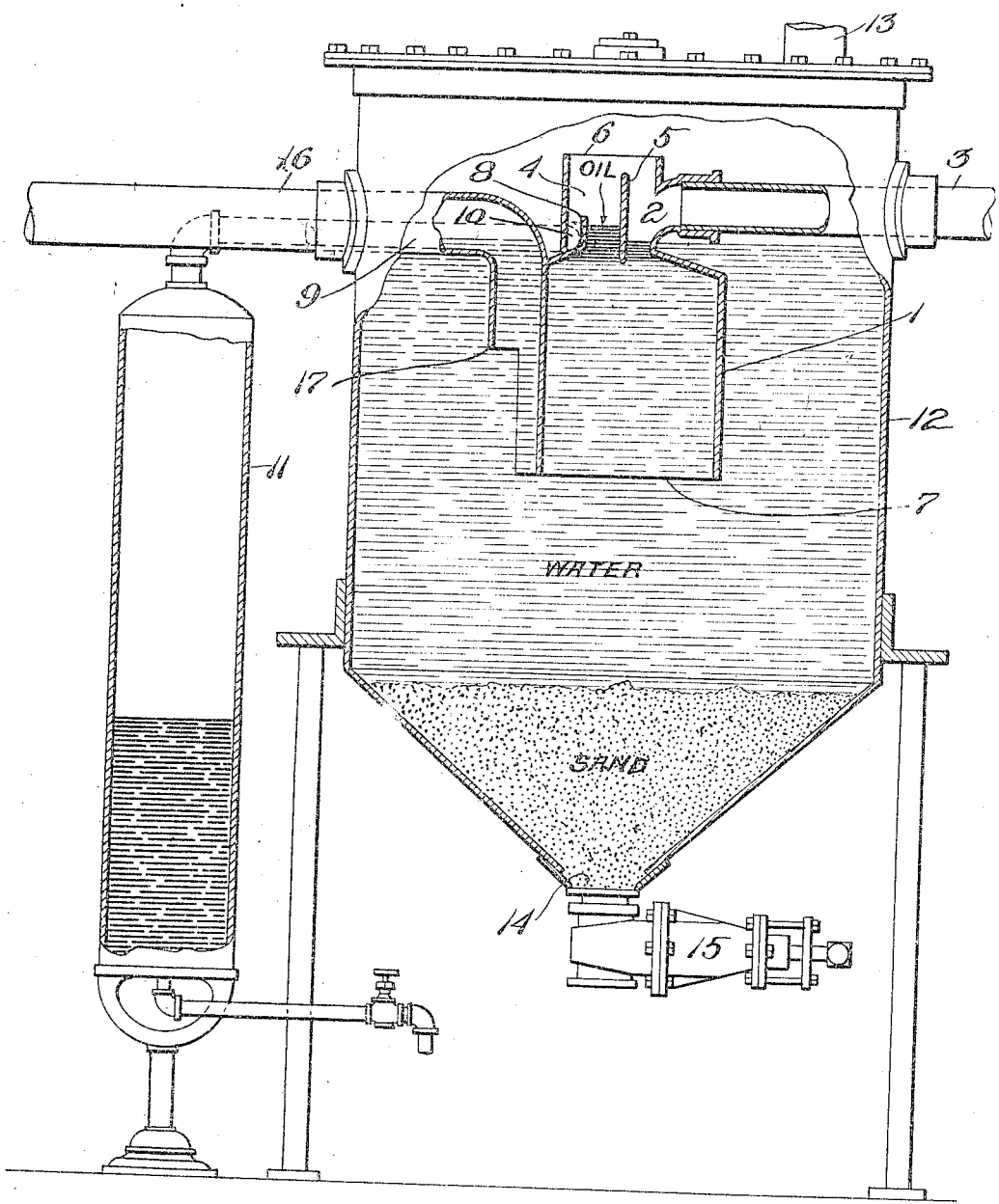

EDWARD C. KELLY, JR., OF BOSTON, MASSACHUSETTS.

SEPARATOR-TRAP.

1,069,789.

Specification of Letters Patent. Patented Aug. 12, 1913.

Application filed April 23, 1913. Serial No. 764,122.

*To all whom it may concern:*

Be it known that I, EDWARD C. KELLY, Jr., a citizen of the United States, and a resident of Boston, in the county of Suffolk and State of Massachusetts, have invented new and useful Improvements in Separator-Traps, of which the following is a specification.

My invention relates to separator traps, and consists of improvements on that class of trap which is shown and described in United States Letters Patent No. 1,005,433, granted to me October 10, 1911. The separator trap shown and described in the said patent fulfils its purpose under all the usual conditions, but it has been found that when an abnormally large quantity of liquid is carried suddenly into the trap, the agitation and oscillation of the liquid therein causes volatile fluids to pass out of the trap through the outlet and also discharges an undesirable quantity of water into the receptacle which, under more normal conditions, receives only lighter fluid such as oil or gasolene. The improvements herein described are designed to take care of such emergencies and to insure proper operation of the separator trap even though a very large quantity of liquid is charged into it suddenly.

The drawing hereto annexed represents, partly in section and partly in elevation, an apparatus embodying these improvements.

In this drawing the trap body 1 comprises essentially the same functional elements as the trap body described in my said patent. The upper part of the body is divided by the vertical partition 5 into two chambers; a receiving chamber 2 which communicates with the inlet pipe 3, and the collecting chamber 4 which receives the lighter fluids which are carried into the trap with the water. Both top and bottom of the trap body are open, as at 6 and 7. The collecting chamber 4 contains a partition or dam 8 which divides the collecting chamber into two portions at the lower part thereof and determines the level of outlet from the collecting chamber; and from one of these compartments 10 issues the oil discharge pipe 9 which communicates with a receptacle 11.

The trap body 1 is inclosed in a tank 12 which is relatively much larger than the trap body, so that the bulk of water contained in the tank 12 is, as contrasted with the water contained in the trap body 1, a dominant mass. The outlet 16 issuing from the tank 12 is at proper level to maintain correct normal relations of water and oil levels within the trap body 1. Should a large quantity of liquid be charged into the trap through the outlet 3, the bulk of liquid standing in the tank 12 is so great that the disturbance produced by the entering liquid is absorbed and little oscillation ensues. The collection of light fluid such as oil or gasolene in the receiving chamber 4 is temporarily raised so that a portion of it may flow into the compartment 10 and thence out through the pipe 9. The outlet pipe 16 is formed with an inverted dam or weir 17 within the tank, so that the outlet pipe is not in communication with the upper portion of the tank, which may contain inflammable gases from the evaporation of volatile fluids. If the inrush of liquid through the inlet pipe 3 is so great as to splash over into the tank through the opening 6 or to carry light volatile fluids down through the body 1 and into the tank 7, such volatile fluids will rise to the surface of the liquid in the tank and there evaporating pass through the vent 13 which preferably is continued to the roof of the building so as to discharge out of doors. The proportion of the total cross sectional area of the tank 12 occupied by the inverted mouth of the outlet pipe 16 is so small that little, if any, volatile liquid will find its way into this outlet pipe. The provision of the inclosing tank 12 also furnishes convenient means for collecting and getting rid of sand or other grit and dirt which is likely to enter the trap. Solid material of this character collects at the bottom of the tank 12, falling through the open bottom 7 of the trap body 1. An aperture 14 controlled by a suitable valve 15 may be provided wherewith occasionally to discharge sand and other dirt from the bottom of the tank.

I claim:

1. In a separator trap, the combination of a trap body open at top and bottom formed with a receiving chamber and a collecting chamber in the upper part of the body, an inlet to the receiving chamber, an outlet from the collecting chamber above the normal level of liquid in the trap, a partition between said chambers extending below said normal liquid level, a tank in which the trap body is inclosed, an outlet for liquid from said tank, and a vent from the upper part of said tank.

2. In a separator trap, the combination of a trap body open at top and bottom formed with a receiving chamber and a collecting chamber in the upper part of the body, an inlet to the receiving chamber, an outlet from the collecting chamber above the normal level of liquid in the trap, a receptacle with which said outlet communicates, a partition between said chambers extending below said normal liquid level, a tank in which the trap body is inclosed, an outlet for liquid from said tank, and a vent from the upper part of said tank.

3. In a separator trap, the combination of a trap body open at top and bottom formed with a receiving chamber and a collecting chamber in the upper part of the body, an inlet to the receiving chamber, an outlet from the collecting chamber above the normal level of liquid in the trap, a partition between said chambers extending below said normal liquid level, a tank in which the trap body is inclosed, an outlet for liquid from said tank, a discharge opening and valve therefor at the bottom of said tank, and a vent from the upper part of said tank.

4. In a separator trap, the combination of a trap body open at top and bottom formed with a receiving chamber and a collecting chamber in the upper part of the body, an inlet to the receiving chamber, an outlet from the collecting chamber above the normal level of liquid in the trap, a receptacle with which said outlet communicates, a partition between said chambers extending below said normal liquid level, a tank in which the trap body is inclosed, an outlet for liquid from said trap, a discharge opening and valve therefor at the bottom of said tank, and a vent from the upper part of said tank.

Signed by me at Boston, Massachusetts this twenty-first day of April 1913.

EDWARD C. KELLY, Jr.

Witnesses:
 ODIN ROBERTS,
 FLORENCE A. COLLINS.